(12) United States Patent
Wong et al.

(10) Patent No.: US 12,739,612 B2
(45) **Date of Patent: *Sep. 15, 2026**

(54) SHARED USE OF CELLULAR NETWORKS TO PROVIDE WIRELESS SERVICES

(71) Applicant: Charter Communications Operating, LLC, St. Louis, MO (US)

(72) Inventors: Curt C Wong, Bellevue, WA (US); Maulik V. Vaidya, Escondido, CA (US); Umamaheswar A. Kakinada, Greenwood Vilage, CO (US); Pratik Das, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 555 days.

This patent is subject to a terminal disclaimer.

(21) Appl. No.: 18/143,342

(22) Filed: May 4, 2023

(65) Prior Publication Data

US 2023/0276328 A1 Aug. 31, 2023

Related U.S. Application Data

(60) Division of application No. 16/789,896, filed on Feb. 13, 2020, now Pat. No. 11,659,463, which is a (Continued)

(51) Int. Cl.
*H04W 8/18* (2009.01)
*H04W 36/00* (2009.01)
(Continued)

(52) U.S. Cl.
CPC ......... *H04W 8/18* (2013.01); *H04W 36/0055* (2013.01); *H04W 76/16* (2018.02); (Continued)

(58) Field of Classification Search
CPC ..... H04W 36/14; H04W 76/36; H04W 76/16; H04W 8/18; H04W 36/0022; (Continued)

(56) References Cited

U.S. PATENT DOCUMENTS 10,021,570 B1 7/2018 Cai
10,595,251 B2 * 3/2020 Wong ................ H04W 36/0055
(Continued)

*Primary Examiner* — Umair Ahsan
(74) *Attorney, Agent, or Firm* — Armis IP Law, LLC

(57) ABSTRACT

A base station in a first wireless network provides first wireless connectivity to user equipment operated by a subscriber. The first wireless network supports first wireless communications such as non-voice communications. A network management resource receives configuration information assigned to the subscriber operating the user equipment. The configuration information indicates that the subscriber is assigned use of a second wireless network that provides support of second wireless communications (such as voice communications). In response to detecting a trigger event (such as a voice call) indicating a need to switch to use of the second wireless network, the network management resource initiates termination of the first wireless connectivity and establishment of second wireless connectivity between the user equipment and a base station in the second wireless network.

24 Claims, 8 Drawing Sheets

Related U.S. Application Data continuation of application No. 15/873,244, filed on Jan. 17, 2018, now Pat. No. 10,595,251.

(51) Int. Cl.

| | |
|---|---|
| ***H04W 36/14*** | (2009.01) |
| ***H04W 36/24*** | (2009.01) |
| ***H04W 76/16*** | (2018.01) |
| ***H04W 76/30*** | (2018.01) |

(52) U.S. Cl.

CPC ...... *H04W 76/30* (2018.02); *H04W 36/00226* (2023.05); *H04W 36/144* (2023.05); *H04W 36/24* (2013.01)

(58) Field of Classification Search

CPC ............. H04W 36/0072; H04W 36/22; H04W 36/385; H04W 84/045; H04W 84/042

See application file for complete search history.

(56) References Cited

U.S. PATENT DOCUMENTS

| | | | | |
|---|---|---|---|---|
| 11,659,463 | B2 * | 5/2023 | Wong | H04W 76/30 455/436 |
| 2009/0036130 | A1 | 2/2009 | Diachina et al. | |
| 2009/0286509 | A1 | 11/2009 | Huber et al. | |
| 2010/0113010 | A1 * | 5/2010 | Tenny | H04L 12/66 455/437 |
| 2010/0304749 | A1 | 12/2010 | Dwyer et al. | |
| 2013/0084850 | A1 | 4/2013 | Martin et al. | |
| 2014/0247730 | A1 * | 9/2014 | Thota | H04W 24/08 370/252 |
| 2014/0348064 | A1 | 11/2014 | Jeong et al. | |
| 2015/0373767 | A1 | 12/2015 | Park et al. | |
| 2016/0262053 | A1 | 9/2016 | Palm et al. | |
| 2016/0330743 | A1 | 11/2016 | Das et al. | |
| 2017/0201923 | A1 | 7/2017 | Yang et al. | |
| 2017/0257800 | A1 | 9/2017 | Lee et al. | |
| 2017/0359815 | A1 | 12/2017 | Chendamaral et al. | |

* cited by examiner

SHARED USE OF CELLULAR NETWORKS TO PROVIDE WIRELESS SERVICES

RELATED APPLICATION

This application is a divisional application of earlier filed U.S. patent application Ser. No. 16/789,896 entitled "SHARED USE OF CELLULAR NETWORKS TO PROVIDE WIRELESS SERVICES,", filed on Feb. 13, 2020, the entire teachings of which are incorporated herein by this reference.

U.S. patent application Ser. No. 16/789,896 is a continuation application of earlier filed U.S. patent application Ser. No. 15/873,244 entitled "SHARED USE OF CELLULAR NETWORKS TO PROVIDE WIRELESS SERVICES," filed on Jan. 17, 2018, the entire teachings of which are incorporated herein by this reference.

BACKGROUND

Conventional LTE (Long Term Evolution) cellular networks typically include a core network, a RAN (Radio Access Network), and one or more mobile communication devices (user equipment). The radio access network resides between user equipment such as a mobile phone, a computer, or any remotely controlled machine and provides connection with its core network (CN). As its name suggests, the radio access network provides respective user equipment access (such as Internet access) via the core network.

A wireless network can be configured to include macro cell and small cell resources to support both voice and data services to user equipment using a single subscription (e.g., one SIM profile). In certain instances, a macro radio layer is normally used to minimize signaling due to inter-cell handover as respective user equipment moves between cells.

BRIEF DESCRIPTION OF EMBODIMENTS

There are deficiencies associated with conventional wireless networks. For example, conventional small cell networks such as those using the 3.5 GHz band or other band may be able to provide data services (such as non-voice communications) to subscribers. However, such small cell wireless networks may not be configured to provide voice services to respective subscribers.

Additionally, conventional small cell wireless networks may support voice communications. However, a handoff of a voice call from a small cell network to a macro cell network requires a substantial amount of overhead signaling and resources.

Embodiments herein provide novel ways of implementing use of different types of wireless networks to support different services.

More specifically, in one embodiment, a wireless network environment includes a first wireless network and a second wireless network. Assume that the first wireless network supports data services (such as non-voice communications) while the second wireless network supports data and/or voice services. By further way of non-limiting example embodiment, the first wireless network can be a so-called small cell network supporting first wireless communications; the second wireless network can be a so-called macro cell network supporting second wireless communications.

A base station in the first wireless network initially provides first wireless connectivity to user equipment operated by a respective subscriber. As mentioned, the first wireless network supports first wireless communications or data services such as non-voice communications. In one embodiment, a network management resource receives configuration information assigned to the subscriber operating the user equipment. Assume that the received configuration information indicates that the subscriber is assigned use of the second wireless network to support the second type of wireless communications (such as voice communications). In response to detecting a trigger event (such as a command to establish a voice call session) indicating a need to switch to use of the second wireless network, via a release and redirect procedure, the network management resource (such as a base station or other suitable resource) initiates (release) termination of the first wireless connectivity and (redirect) establishment of second wireless connectivity between the user equipment and a base station in the second wireless network.

Thus, user equipment initially may be provided network connectivity via the first wireless network. In one embodiment, in response to detecting a condition such as a desire to establish a voice communication session such as a phone call, the network management resource initiates a handoff of the user equipment from a small cell network (wireless network #1) to a macro cell network (wireless network #2). Upon termination of the voice session, the user equipment can be configured to wirelessly connect to (such as camp on) the first wireless network again.

In this manner, a subscriber may operate user equipment to establish wireless connectivity to a remote network such as the Internet via communications over the first wireless network (small cell network). In the event of a voice call, the user equipment switches over to use of the second wireless network. Upon completion of the voice call, the user equipment can be configured to switch back to using the small cell network.

In one embodiment, the user equipment switches over to establishing the new voice communication session over the second wireless network in response to detecting input to establish the voice call as opposed to initially establishing the voice call over the wireless network #1 and then handing off the voice session to the wireless network #2.

Embodiments herein are useful over conventional techniques of providing wireless network coverage. For example, a small cell network (such as wireless network #1) provides non-voice services to a respective subscriber. A macro cell network provides voice services (and/or data services) to the user equipment operated by the subscriber on an as-needed basis. Upon completion of a voice session, the user equipment reverts back to camping on or connecting to the first wireless network.

Conventional PLMN (Public Land Mobile Network) handover signaling to move between PLMNs requires a substantial amount of S1 signaling between networks to perform a handoff. In contrast to such conventional techniques, embodiments herein include using an RRC (Radio Resource Control) release with redirection to reduce overhead processing required to communicate over multiple different networks. These and other more specific additional embodiments are disclosed herein as further discussed below.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by computer processor hardware, cause the computer processor hardware (such as one or more co-located or disparately processor devices) to: provide first wireless connectivity to user equipment via a base station in a first wireless network that supports first wireless communications; receive configuration information assigned to a subscriber operating the user equipment, the configuration information indicating that the subscriber is assigned use of a second wireless network for use of second wireless communications; and in response to detecting a trigger event (such as a voice call) indicating to switch to use of the second wireless network, initiate: i) (release) termination of the first wireless connectivity and ii) (redirection) establishment of second wireless connectivity between the user equipment and a base station in the second wireless network. Thus, embodiments herein include release and redirection of the user equipment from wireless network #2 to wireless network #1. In one embodiment, via notification of a list of carrier frequencies in which the carrier frequencies of the wireless network #1 are ranked higher in the list for selection by the user equipment if they are available ensures redirection to wireless network #1 if available.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

Figure 1:
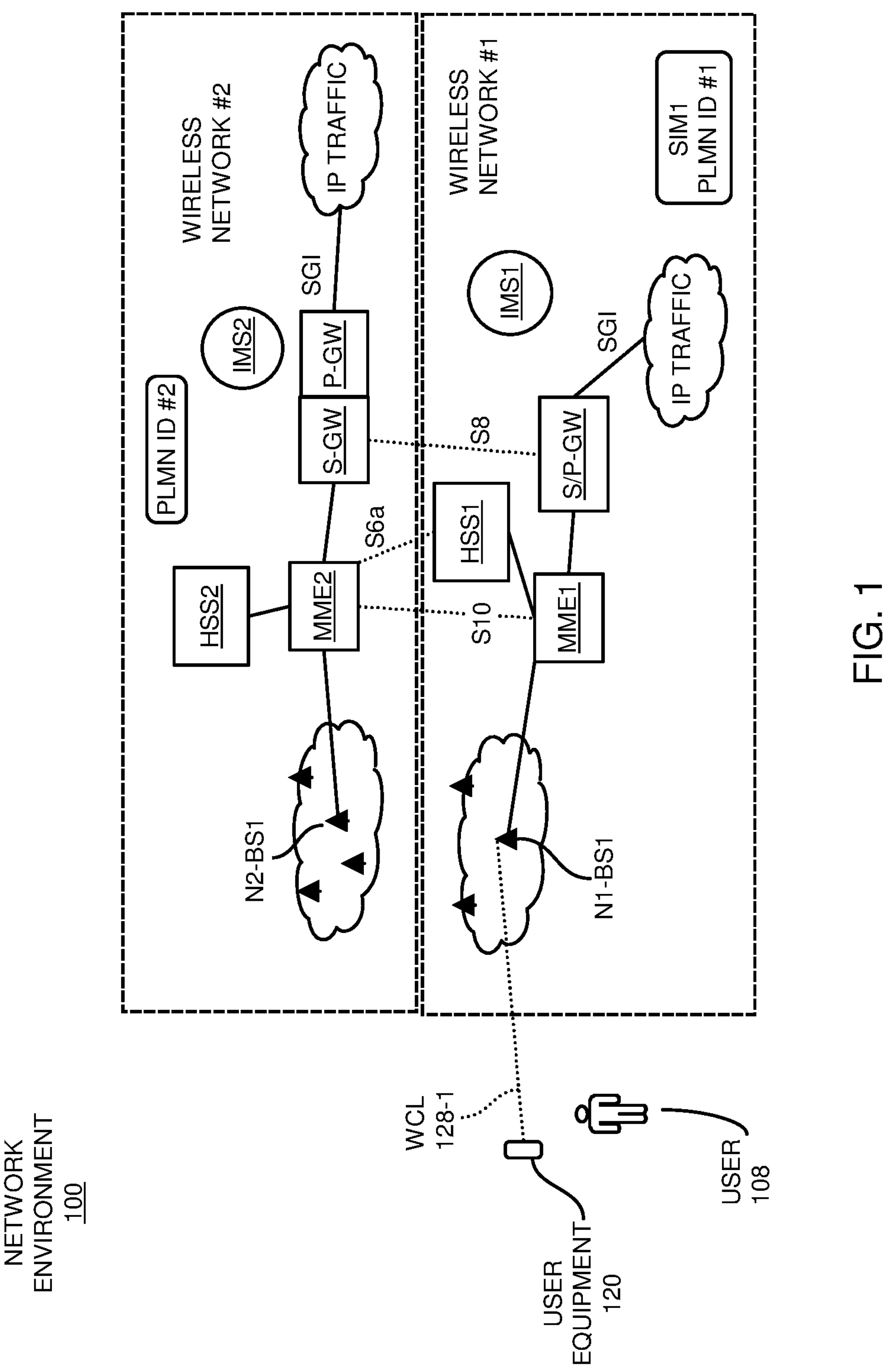
FIG. 1 is an example diagram illustrating connectivity of user equipment to a first base station of a first wireless network according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a base station in a first wireless network provides first wireless connectivity to user equipment operated by a subscriber. The first wireless network supports first wireless communications such as non-voice communications. A network management resource receives configuration information assigned to the subscriber operating the user equipment. The configuration information indicates that the subscriber is assigned use of a second wireless network that provides support of second wireless communications (such as voice communications). In response to detecting a trigger event (such as signaling indicating a voice call) to switch to use of the second wireless network, the network management resource initiates termination of the first wireless connectivity and establishment of second wireless connectivity between the user equipment and a base station in the second wireless network to support the voice communication session.

As further described herein, the release and redirection of the user equipment from wireless network #2 to wireless network #1 can include notification of a list of carrier frequencies in which the carrier frequencies of the wireless network #1 are ranked higher in the list for selection by the user equipment if they are available. This ensures redirection to wireless network #1 and corresponding base stations if available.

In one embodiment, upon completion of a voice communication session, via a release and redirection technique, the user equipment reverts back to camping on or using data services provided by the first wireless network. Accordingly, a user operating the user equipment is able to use wireless communication services provided by a first wireless network service provider and temporarily switch to use of voice communication services provided by a second wireless network service provider.

Now, more specifically, FIG. 1 is an example diagram illustrating a network environment including multiple wireless networks according to embodiments herein.

As shown, wireless network environment 100 includes multiple wireless networks including wireless network #1 and wireless network #2. As further described herein, wireless network #1 includes network management hardware such as multiple base stations, network management resource MME1, network management resource HSS1, network management resource IMS1, etc., executing corresponding software to provide management and connectivity to wireless network #1. Wireless network #2 includes network management hardware such as multiple base stations, network management resource MME2, network management resource HSS2, network management resource IMS2, etc., executing corresponding software to provide management and connectivity to wireless network #2.

In one embodiment, the wireless network #1 is provided and/or operated by a first wireless network service provider. The wireless network #2 is provided and/or operated by a second wireless network service provider.

In accordance with subscription agreements between service providers, wireless network #1 can be configured to support first wireless communications (such as data services) including non-voice communications. Wireless network #2 can be configured to support second wireless communications (such as voice services) including voice communications.

If desired, note that the wireless network #2 can be configured to support data communications (such as non-voice communications) as well.

As previously discussed, user equipment 120 (such as a mobile communication device) in the wireless network environment 100 can be configured to default back to (or camp on) wireless network #1 when possible. As further discussed below, user equipment 120 in wireless network environment 100 can be temporarily handed off to wireless network #2 during conditions in which the respective user equipment requests use of voice services such as to make or receive a phone call.

In accordance with further embodiments, note that wireless network #1 includes any number of base stations. In this example embodiment, the wireless network #1 includes at least base station N1-BS1 (Network 1, Base Station 1), base station N1-BS2 (Network 1, Base Station 2), etc.

Wireless network #2 includes any number of base stations. In this example embodiment, the wireless network #2 includes at least base station N2-BS1 (Network 2, Base Station 1), base station N2-BS2 (Network 2, Base Station 2), etc.

Wireless network #1 and wireless network #2 are both defined in the user equipment 120 as being an equivalent home PLMN (Public Land Mobile Network) to the user equipment 120. Accordingly, the user equipment 120 can connect to different networks without the corresponding internal protocol stack of the user equipment 120 from being reset each time the user equipment 120 switches from using one network (such as wireless network #1) to using another network (such as wireless network #2).

Note further that each of the wireless networks #1 and #2 support communications with corresponding one or more mobile communication devices (a.k.a., user equipment) present in the wireless network environment 100. In one embodiment, wireless network environment 100 and corresponding wireless networks #1 and #2 each support wireless communications (such as based on 3G/HSPA, 4G/LTE, 5G/NR etc.). However, note that each of the wireless networks #1 and #2 can be configured to support wireless link communications in accordance with any suitable type of one or more communication protocols. In other words, the wireless network #1 can be deployed in accordance with, for example, small cell using 5G network architecture.

Additionally or alternatively, if desired, the base stations in wireless network #1 can be configured to support communications via use of one or more carrier frequencies in the shared spectrum bands such as CBRS (Citizen Band Radio System) band. The set of one or more base stations in the wireless network #2 can be configured to support wireless communications via one or more carrier frequencies in a non-shared spectrum (such as a licensed band, non-CBRS band, etc.). In such an instance, the base station N1-BS1 provides first wireless communication link 128-1 (wireless connectivity) to user equipment 120 (such as a mobile communication device) via one or more carrier frequencies in the CBRS (Citizens Band Radio System) spectrum. As further discussed herein, subsequent to a handoff or redirection of the user equipment 120 to the wireless network #2, a respective base station such as base station N2-BS1 in wireless network #2 provides wireless connectivity over one or more carrier frequencies in the non-CBRS band.

Figure 2:
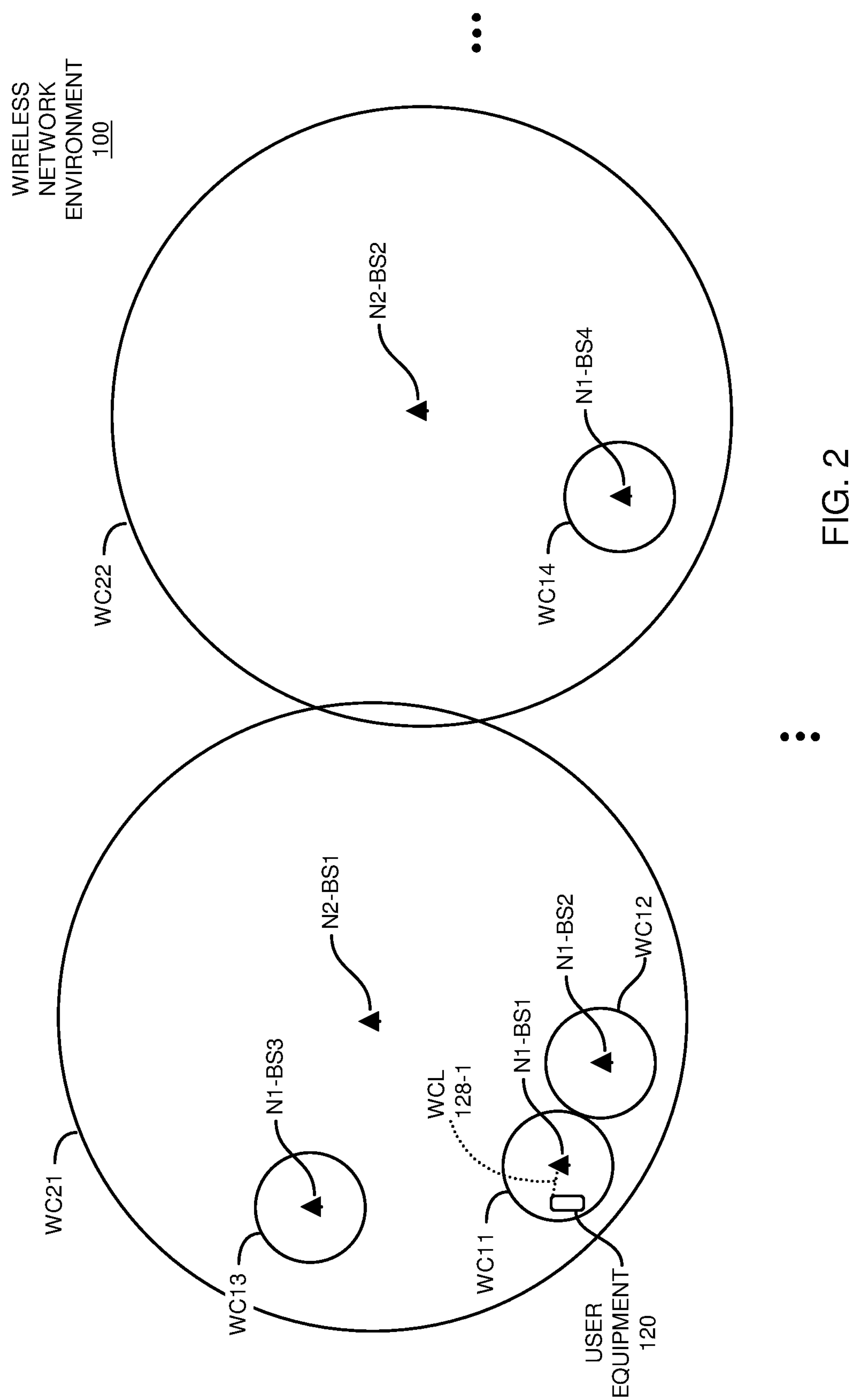
FIG. 2 is an example diagram illustrating multiple wireless networks and corresponding wireless coverage according to embodiments herein.

FIG. 2 is an example diagram illustrating base station and corresponding wireless coverage provided by multiple wireless networks according to embodiments herein.

As shown in FIG. 2, by way of non-limiting example embodiment, wireless network #1 and corresponding base stations N1-BS1, N1-BS2, N1-BS3, N1-BS4, etc., can be so-called small cell base stations allocated to support first wireless communications (data services) such as non-voice communications. In such an embodiment, base station N1-BS1 supports wireless coverage WC11; base station N1-BS2 supports wireless coverage WC12; base station N1-BS3 supports wireless coverage WC13; base station N1-BS4 supports wireless coverage WC14; and so on.

Wireless network #2 and corresponding base stations N2-BS1, N2-BS2, etc., can be so-called macro cell base stations allocated to support second wireless communications such as at least voice communications. In this example embodiment, base station N2-BS1 supports wireless coverage WC21; base station N2-BS2 supports wireless coverage WC22; and so on.

As previously discussed, based on service agreements, the second type of wireless communications (such as voice communications or voice services) may not be supported by wireless network #1. In other words, to make an outbound call or receive an inbound call, the user equipment 120 and corresponding subscriber (such as user 108) may be required to or configured to use communication services provided by wireless network #2.

In one embodiment, as previously discussed, the first wireless communications supported by wireless network #1 are short-range wireless communications. As previously discussed, wireless network #1 includes any number of base stations such as N1-BS1, N1-BS2, N1-BS3, N1-BS4, etc. Such short-range base stations can be low-powered cellular radio access nodes that operate in licensed and/or unlicensed spectrum that support a range between 5 meters to a distance up to 5 kilometers. The second wireless communications supported by the long-range base stations N2-BS1, N2-BS2, etc., can be long range wireless communications supporting substantially farther connectivity with respect to a base station than the short range wireless communications in wireless network #1.

In one embodiment, each of the long-range base stations such as stations N2-BS1, N2-BS2, etc., in the wireless network #2 provide at least twice the amount of wireless coverage than the short-range base stations in the wireless network #1. Each macro cell in wireless network #2 can be configured to provide RF power output on the order of tens of watts.

Note that the coverage provided by the base stations in each of the wireless network #1 and wireless network #2 as discussed above are shown by way of non-limiting example embodiment. In accordance with further embodiments, the wireless coverage (or distance supported) by the base stations in wireless network #1 and wireless network #2 can be of any size. In other words, as previously discussed, wireless network #2 may be a small cell network and wireless network #1 may be a macro cell network. However, both wireless network #1 and wireless network #2 may be small cell networks. Note that that configuration of the wireless network #1 as a small cell network and configuration of wireless network #2 as a macro cell network may be desirable in cases where an excessive number of handoffs are undesirable in a small cell network in which a respective user must switch from one cell to another due to a high rate of mobility. Use of a macro-cell base stations (as opposed to small cell base stations) reduces handoffs because long-range base stations support long-range wireless coverage to respective user equipment.

In one embodiment, the voice communications supported by wireless network #2 are not supported by wireless network #1.

Figure 3:
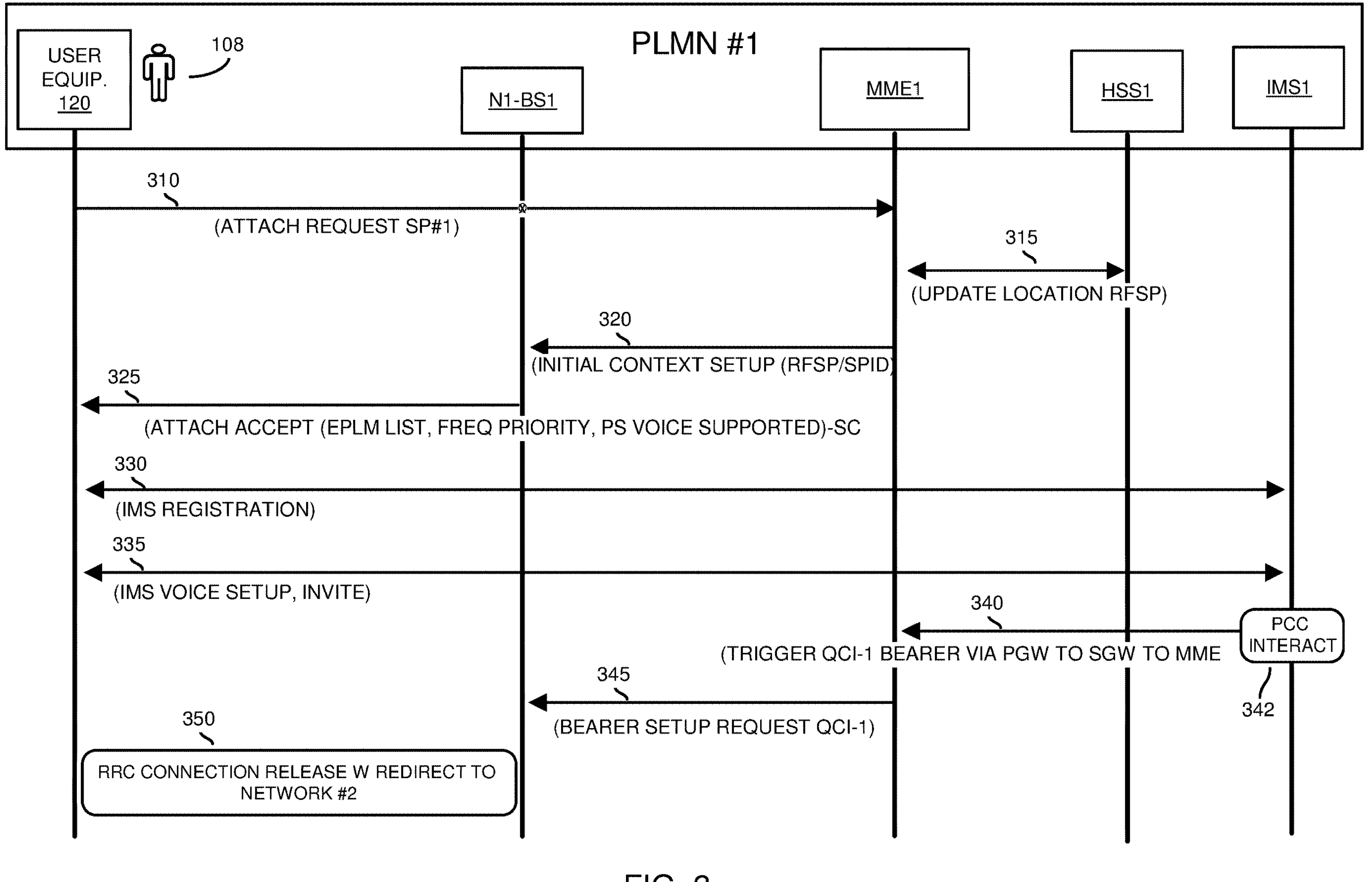
FIG. 3 is an example diagram illustrating communications facilitating redirection of user equipment from a first wireless network to a second wireless network according to embodiments herein.

FIG. 3 is an example diagram illustrating initial use of a first wireless network and then conveyance of communications facilitating a handoff of user equipment from a first wireless network to a second wireless network according to embodiments herein.

As shown in FIG. 3, via communications 310 from user equipment 120 to the base station N1-BS1 and network management resource MME1 (Mobile Management Entity of wireless network #1), the user equipment 120 operated by user 108 performs normal LTE attachment to wireless network #1 (such as a first public land mobile network). As discussed herein, the wireless network #1 provides first wireless connectivity (shared communication link 128-1) to user equipment 120 via base station N1-BS1. The wireless communication link 128-1 provides the user equipment 120 access to one or more remote networks such as the Internet.

Via communications 315, the network management resource HSS1 (Home Subscriber Server of wireless network #1) notifies the network management resource MME1 of configuration information associated with the user 108 (subscriber). For example, based on an identity of the user 108 and/or corresponding user equipment 120, the network management resource MME1 retrieves subscription profile information (configuration information) associated with the user 108 from network management resource HSS1. In one embodiment, the received configuration or profile information includes core parameters/settings indicating that wireless network #2 is assigned for use by the user equipment 120 to support, for example, at least voice calls (sessions) associated with the user 108 (subscriber) and that wireless network #1 is a default wireless network in which to provide data services (such as non-voice communications) to the user equipment 120. Thus, via communications 315, network management resource MME1 receives configuration information (profile information) assigned to the subscriber (user108) operating the user equipment 120. Assume that the configuration information in this example embodiment indicates that the user 108 is assigned use of wireless network #2 to support at least voice communications and possibly data communications as well.

In accordance with further embodiments, via communications 315, the network management resource HSS1 provides RFSP (Radio Frequency Selection Priority) information such as RFSP index value (indicating appropriate carrier frequencies profile) or other suitable frequency selection information or priority information associated with the user 108 to the network management resource MME1. The RFSP information (such as one or more index values) allows a respective resource to identify which carrier frequencies are preferred. In one embodiment, the RFSP information and/or profile information associated with the user 108, which is later forwarded to the base station N1-BS1 (in communications 320), enables the base station N1-BS1 to determine that the user equipment 120 in this case is configured to use the wireless network #2 for voice communications and wireless network #1 for data (non-voice) communications. In accordance with yet further embodiments, as further discussed below, the radio frequency selection information notifies the user equipment 120 to camp on the wireless network #1 (using appropriate carrier frequencies assigned to wireless network #1) when idle.

Via communications 320, the network management resource MME1 forwards the RFSP (Radio Frequency Selection Priority) information (such as an SPID or Service Provider Identifier) in S 1AP signaling to the base station N1-BS1. In addition, the EPLMN list provides notification that the user subscribes to both wireless network #1 (such as provided by a first wireless network service provider) and wireless network #2 (such as provided by a second wireless network service provider or MNO (Mobile Network Operator). In one embodiment, PS voice indication is set to a corresponding YES value as according to 3GPP TS 23.401. In yet further embodiments, as further discussed below, the RFSP information allows the base station N1-BS1 (such as an eNode B) to perform a release and redirect of the user equipment 120 to the wireless network #2 in response to a corresponding voice call.

Via communications 325, the base station N1-BS1 notifies the user equipment 120 that the original requested connection to the base station N1-BS 1 (wireless network #1) has been accepted. In one embodiment, the base station N1-BS1 uses the received RFSP/SPID information to map to a local RRM configuration. This is to ensure the user equipment 120 will always consider carrier frequencies related to wireless network #1 (such as PLMN #1) as being highest priority when camping or connecting to a respective network. In other words, for non-voice calls and corresponding data services, using prior received frequency selection information originating from network management resource HSS1, the user equipment 120 defaults to use of or camps on a base station in wireless network #1. For voice calls, the user equipment 120 uses an appropriate frequency to connect to the wireless network #2.

Communications 330 between the user equipment 120 and the network management resource IMS1 include IMS registration of the user equipment 120 for a communications session such as a voice call. In one embodiment, communications 330 occur in response to a user 108 requesting to establish a voice communication session.

Communications 335 between the user equipment 120 and the IMS1 support IMS voice setup as well as include a corresponding call invite.

Via operation 342 and corresponding communications 340, the network management resource IMS1 notifies the network management resource MME1 of the voice call. Communications 340 from the network management resource IMS1 can include sending a QCI-1 notification to the network management resource MME1 to indicate the voice session being created.

Via communications 345, the network management resource MME1 notifies the base station N1-BS1 via forwarding of the QCI-1 signal or other suitable message indicating the voice session creation. Accordingly, because prior communications to the base station indicated that the user equipment 120 is assigned use of the wireless network #2 for voice communication sessions, receipt of the notification of the voice session prompts the base station N1-BS1 to via subsequent communications 350 to the user equipment 120.

Via operations and corresponding communications 350 between the base station N1-BS1 and the user equipment 120, the base station N1-BS1 performs RRC connection release with redirection to the wireless network #2 (such as the macro layer Frequency). In one embodiment, in operation 350, in response to detecting a trigger event (such as setup of a voice call as indicated by quality of service class information such as QCI-1 signal indicating a voice call in which the user equipment 120 is a called or calling party), the base station N1-BS 1 initiates termination of the wireless communication link 128-1 (first wireless connectivity) and instructs the user equipment 120 to perform the establishment of wireless communication link 128-2 (second wireless connectivity) between the user equipment and a base station (such as base station N2-BS1) in the wireless network #2. As previously discussed, in one embodiment, the network management resource MME1 and base station N1-BS1 receive notification of the trigger condition such as QCI-1 via detecting occurrence of an outbound voice call being made by the subscriber operating the user equipment.

In accordance with further embodiments, operations and corresponding communications 350 of initiating termination (release) of first wireless connectivity and establishment of the second wireless connectivity (redirect) includes: communicating a command from the base station N1-BS1 to the user equipment 120. The command causes the user equipment 120 to select a wireless frequency associated with wireless network #2 to establish the voice communication session. In one embodiment, the user equipment 120 uses carrier frequency selection information as previously received in communication 325.

Thus, user 108 may initially operate user equipment 120 to retrieve content from the Internet over wireless communication link 128-1 to base station N1-BS1. When the user 108 requests to make a voice call with the user equipment 120, the user equipment 120 is notified to switchover or redirected to use ranked carrier frequencies associated with wireless network #2 to establish the voice call. In one embodiment, as previously discussed, the user equipment 120 is notified of the corresponding ranked list of possible carrier frequencies to switch over to connecting to use of wireless network #2 via prior communications 325.

Embodiments herein can include establishing a voice call with a macro cell network instead of the small cell network to avoid complexity of having to later handoff of a voice call established in a small cell network to a base station in a macro cell network. In other words, embodiments herein avoid excess S1 based signaling between wireless network #1 and wireless network #2 to handoff a voice session established in wireless network #1 to wireless network #2.

Figure 4:
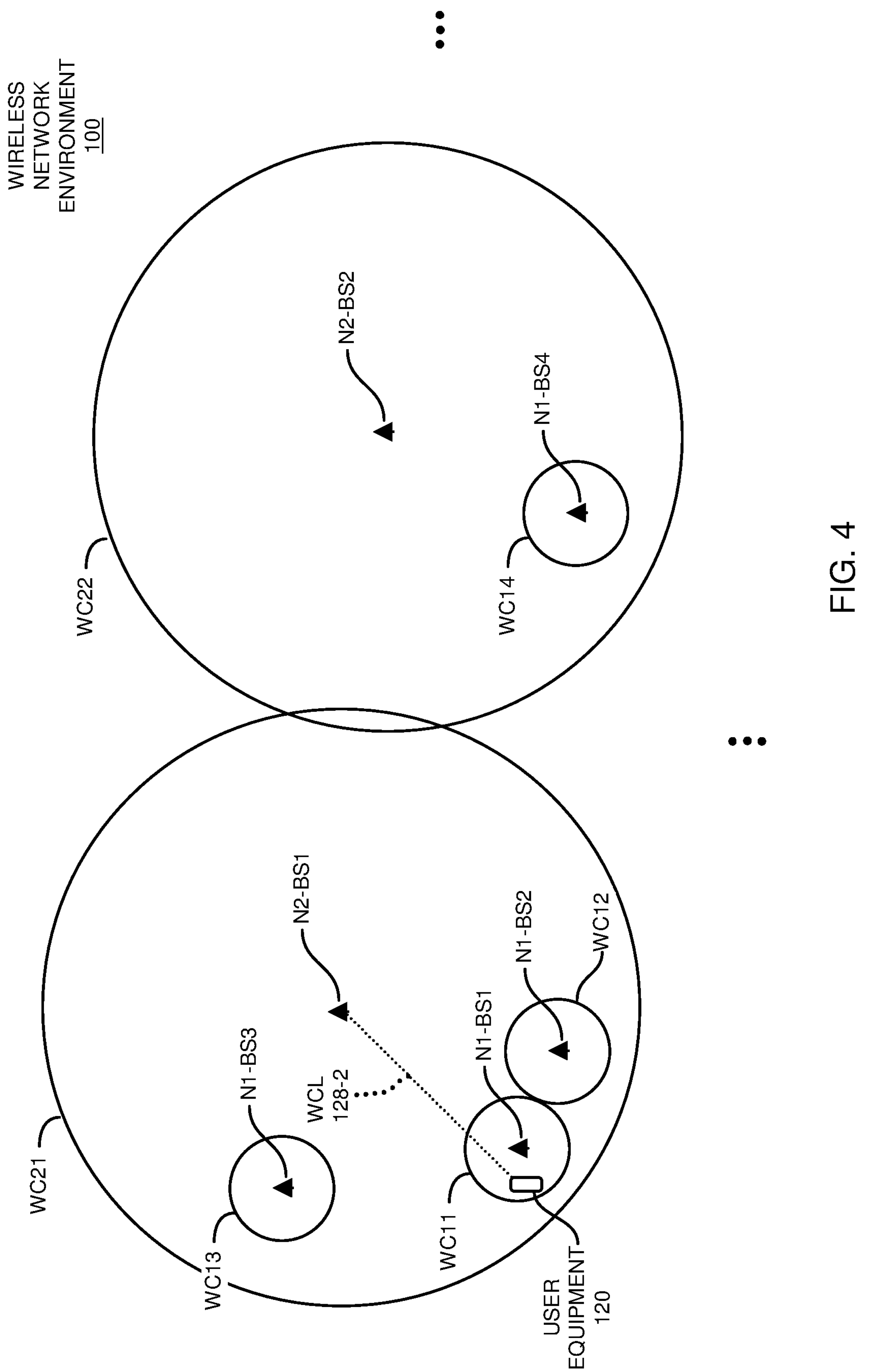
FIG. 4 is an example diagram illustrating connectivity of user equipment to a first base station of a second wireless network according to embodiments herein.

FIG. 4 is an example diagram illustrating connectivity of user equipment to a first base station of a second wireless network according to embodiments herein.

As shown, subsequent to the release and redirection of the user equipment 120 to base station N2-BS1 in wireless network #2, the wireless communication link 128-2 supports wireless communications (such as voice communications) between the user equipment 120 and the base station N2-BS1 via a selected carrier frequency associated with wireless network #2. As previously discussed, the user equipment 120 selects the carrier frequency from a ranked set of carrier frequencies.

In one embodiment, the wireless communication link 128-2 supports a communication session to convey the second wireless communications (voice communications) between the user equipment 120 and the wireless network #2. In accordance with further embodiments, as previously discussed, the wireless communication link 128-2 can be configured to continue support of an original data (non-voice) communication session over the newly established wireless communication link 128-2 (second wireless connectivity) between the user equipment 120 and the base station N2-BS 1 of the wireless network #2. Thus, a respective user 108 need not disrupt use of data services when making or receiving a phone call because wireless communication link 128 can be configured to support a new phone call as well as provide continued support of a data communication session originating over wireless communication link 128-1.

Figure 5:
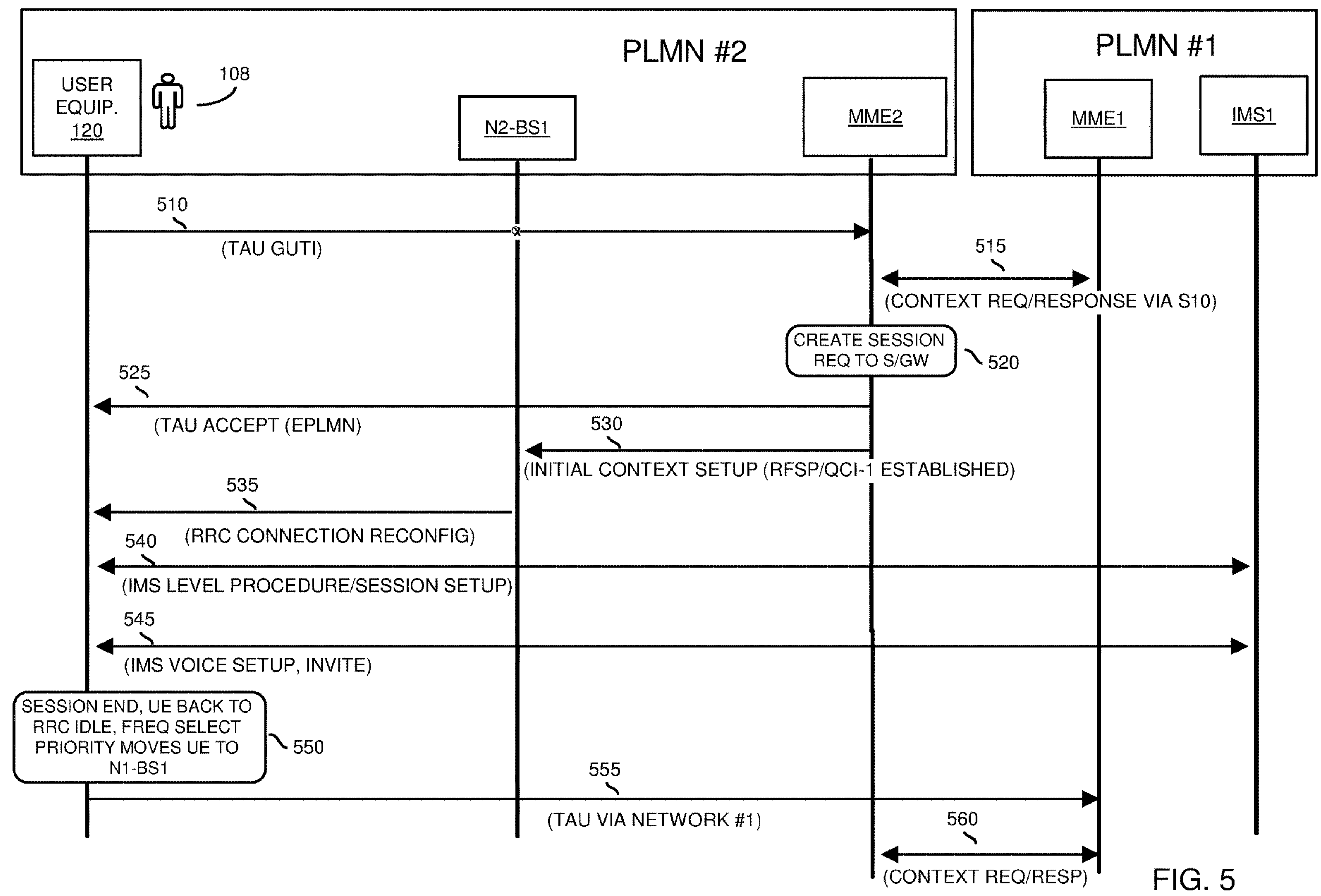
FIG. 5 is an example diagram illustrating communications facilitating redirection of user equipment from the second wireless network to the first wireless network according to embodiments herein.

FIG. 5 is an example diagram illustrating communications facilitating switchover of user equipment between wireless networks according to embodiments herein.

Via communications 510, and selected carrier frequency, the user equipment 120 connects to the base station N2-BS1 and provides corresponding tracking area update information (such as in accordance with TS 23.401) through the base station N2-BS1 to the network management resource MME2. This notifies the base station N2-BS1 of the presence of user equipment 120.

Via communications 515, and signaling such as S10, the GUTI (Globally Unique Temporary ID) received from user equipment 120 allows the network management resource MME2 to retrieve the user equipment (UE) context information from (old) network management resource MME1. In one embodiment, the context information conveyed from network management resource MME1 to network management resource MME2 includes: i) respective encryption information assigned to communicate with the user equipment 120, ii) identity information of the user equipment 120 and subscriber user 108, iii) ranked carrier frequency selection information such as RFSP index information as previously discussed. Thus, the network management resource MME1 notifies the network management resource MME2 of configuration information associated with the user equipment 120 and corresponding subscriber user 108 connecting to wireless network #2 via communications 515.

Via operation 520, the network management resource MME2 sets up the GTP-U to P-GW based on UE context received from network management resource MME1, including voice related EPS bearers.

Via communications 525, the network management resource MME2, based on the carrier frequency selection information (such as RFSP index), includes EPLMN list indicating wireless network #1 and wireless network 2. In this example embodiment, the base station N2-BS1 further indicates that the tracking update information has been accepted.

Via communications 530, the network management resource MME2 continues EPS bearer setup toward the UE with Initial Context Setup. This notifies the base station N2-BS1 to cause or instruct the user equipment 120 to camp or connect to the wireless network #1 after the voice communication session has been completed (such as when the user equipment 120 is idle again).

Via communications 535, the base station N2-BS1 (such as an eNodeB) sets the RRM based on RFSP received from communications 530, which sets the carrier frequencies assigned for using wireless network #1 as being the highest preference for use by the user equipment 120 to reconnect to wireless network #1. In other words, the base station N2-BS1 notifies the user equipment 120 of a list of one or more preferred carrier frequencies to be used by the user equipment to reconnect or camp the user equipment 120 to the appropriate network (in this wireless network #1) after becoming idle. Again, the carrier frequencies associated with wireless network #1 are highest in the list. Thus, if possible, the user equipment 120 connects to the wireless network #1 again. If the user equipment 120 cannot switchover to the wireless network #1, the user equipment 120 stays camped on or connected to the wireless network #2. In one embodiment, the carrier frequencies of the wireless network #2 are included in the list at a lower ranking. Accordingly, the lower ranked carrier frequencies are selected only if the wireless network #1 is unavailable via the higher ranked carrier frequencies.

Via communications 540, the user equipment 120 continues with a normal voice session setup procedure to support the voice phone call.

Via communications 545, the user 120 operating user equipment 120 (such as mobile communication device, mobile computer device, phone device, etc.) communicates with a respective target device over the respective newly established voice communication session.

In operation 550, the user equipment 120 detects that the user 108 ends the voice call (communication session). In such an instance, in response to the voice call ending, the user equipment 120 reverts back to RRC-IDLE mode. In such an instance, the user equipment 120 then scans for the preferred carrier frequencies specified in communications 535 to reconnect or camp the user equipment 120 to the base station N1-BS1 (or other available base station in wireless network #1).

Via communications 555, the user equipment 120 uses a selected carrier frequency from the ranking of preferred carrier frequencies to communicate through base station N1-BS1 to provide tracking area update information to network management resource MME1. This camps or reconnects the user equipment 120 to the wireless network #1 again after the voice call is over.

Via communications 560, the context information conveyed from network management resource MME2 to network management resource MME1 includes: i) respective encryption information assigned to communicate with the user equipment 120, ii) identity information of the user equipment 120 and subscriber user 108, iii) and carrier frequency selection information such as RFSP index information as previously discussed. Thus, the network management resource MME2 notifies the network management resource MME1 of configuration information associated with the user equipment 120 and corresponding subscriber user 108 connecting to wireless network #1.

Figure 6:
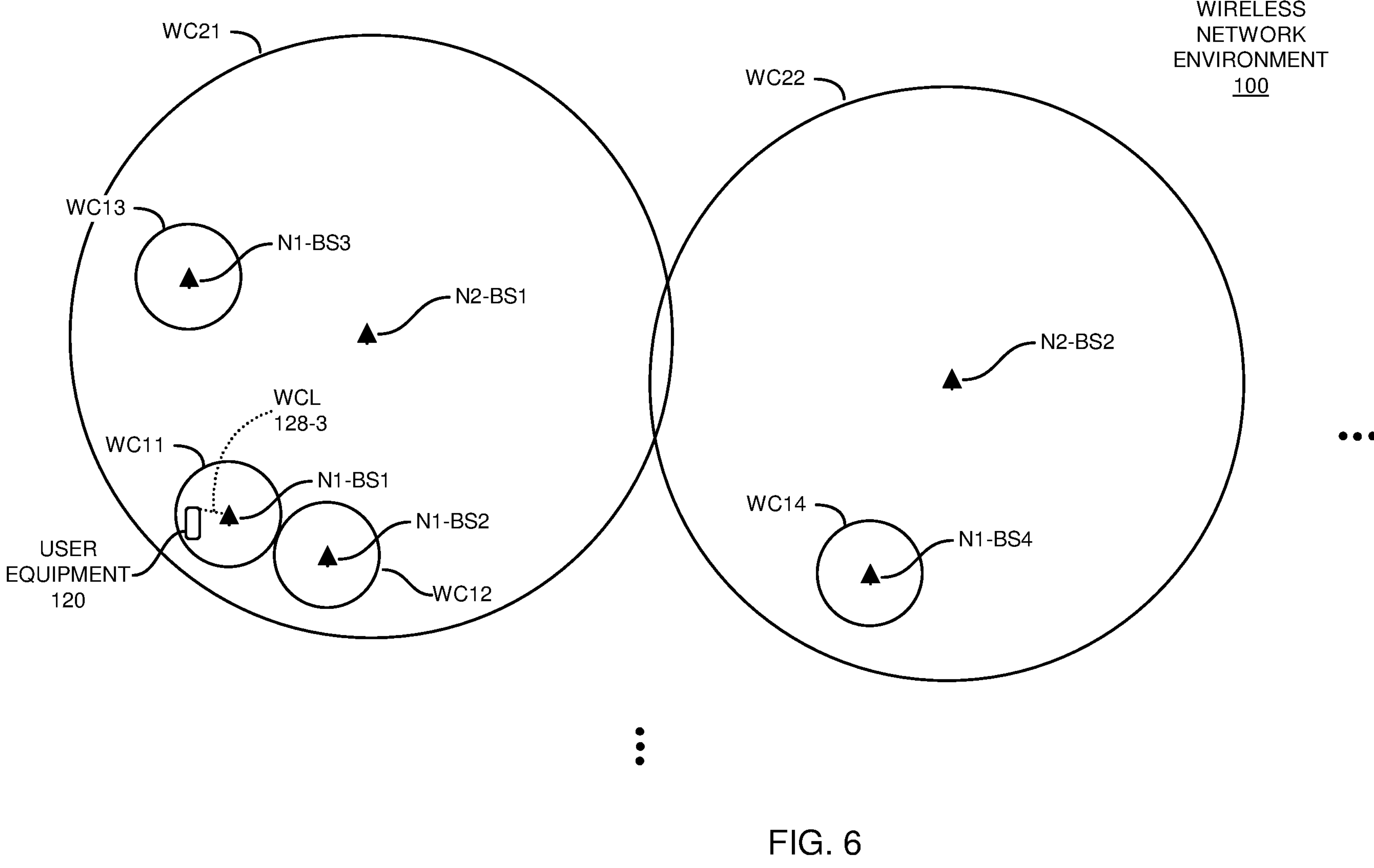
FIG. 6 is an example diagram illustrating connectivity of user equipment back to the first base station of the first wireless network according to embodiments herein.

FIG. 6 is an example diagram illustrating connectivity of user equipment back to the first base station of the first wireless network according to embodiments herein.

As shown in FIG. 6, subsequent to completion or termination of a voice communication session, the user equipment 120 reverts back to use of wireless communication link 128-3 to camp on or connect to a base station such as base station N1-BS1 in wireless network #1. If the user equipment 120 happens to move from one location to another during the phone call, the user equipment 120 can connect to any available base station in wireless network #1. As previously discussed, if wireless network #1 and corresponding resources are unavailable, the user equipment 120 stays connected to the wireless network #2.

Figure 7:
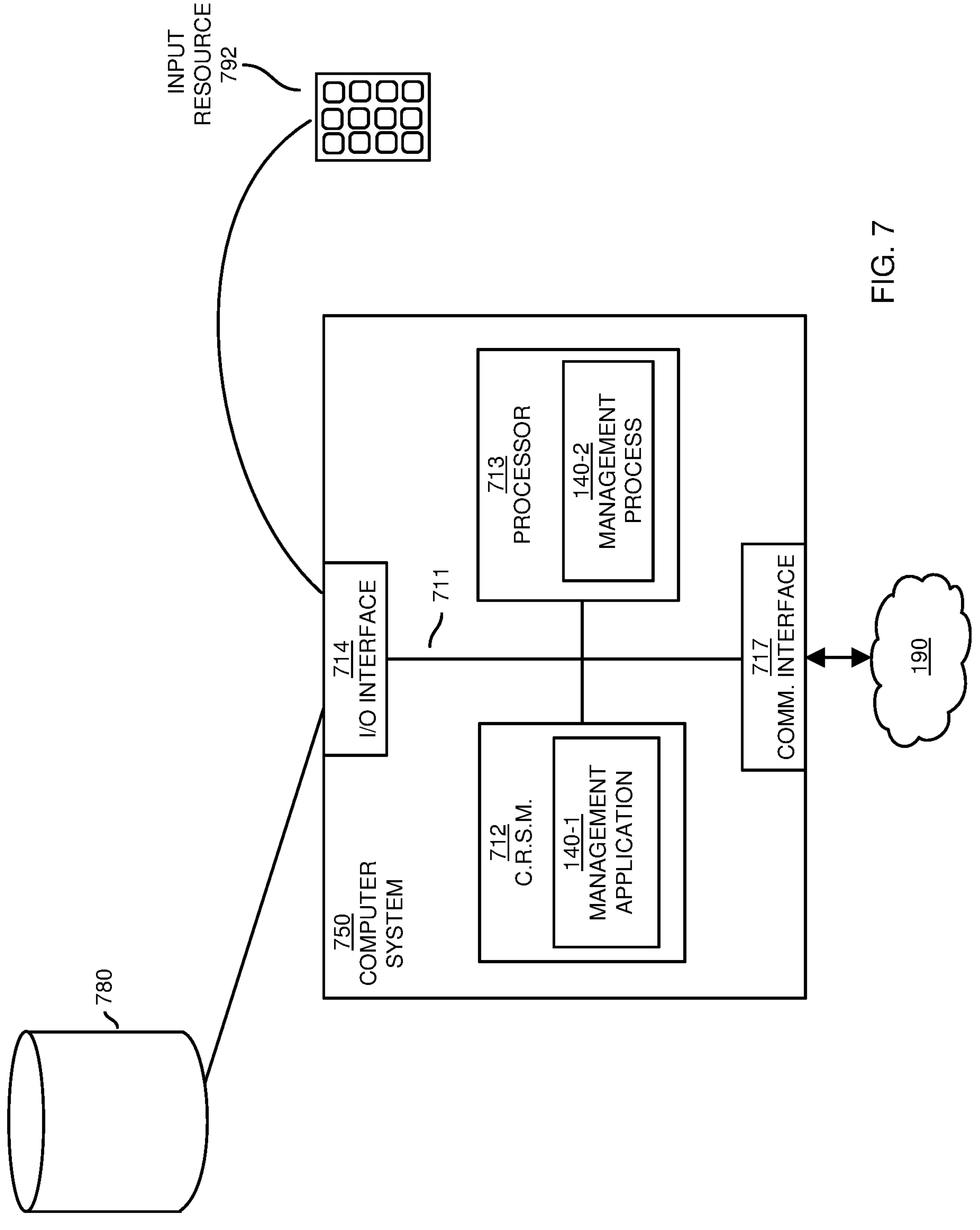
FIG. 7 is a diagram illustrating example computer architecture to execute one or more operations according to embodiments herein.

FIG. 7 is an example block diagram of a computer system for implementing any of the operations as discussed herein according to embodiments herein.

Any of the resources (such as network management resource MME1, network management resource MME2, network management resource HSS1, network management resource HSS2, base station N1-BS1, base station N1-BS2, base station N2-BS1, etc.) as discussed herein can be configured to include computer processor hardware and corresponding executable instructions to carry out the different operations as discussed herein.

As shown, computer system 750 of the present example can include an interconnect 711 that couples computer readable storage media 712 such as a non-transitory type of media (i.e., any type of hardware storage medium) in which digital information can be stored and retrieved, a processor 713, I/O interface 714, and a communications interface 717.

I/O interface 714 supports connectivity to repository 780 and input resource 792.

Computer readable storage medium 712 can be any hardware storage device such as memory, optical storage, hard drive, floppy disk, etc. In one embodiment, the computer readable storage medium 712 stores instructions and/or data.

As shown, computer readable storage media 712 can be encoded with management application 140-1 (e.g., including instructions) to carry out any of the operations as discussed herein. Any of the resources During operation of one embodiment, processor 713 accesses computer readable storage media 712 via the use of interconnect 711 in order to launch, run, execute, interpret or otherwise perform the instructions in network management application 140-1 stored on computer readable storage medium 712. Execution of the network management application 140-1 produces network management process 140-2 to carry out any of the operations and/or processes as discussed herein.

Those skilled in the art will understand that the computer system 750 can include other processes and/or software and hardware components, such as an operating system that controls allocation and use of hardware resources to network management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 750 may reside at any location or can be included in any suitable resource in any network environment to implement functionality as discussed herein.

Functionality supported by the different resources will now be discussed via flowcharts in FIG. 8. Note that the steps in the flowcharts below can be executed in any suitable order.

Figure 8:
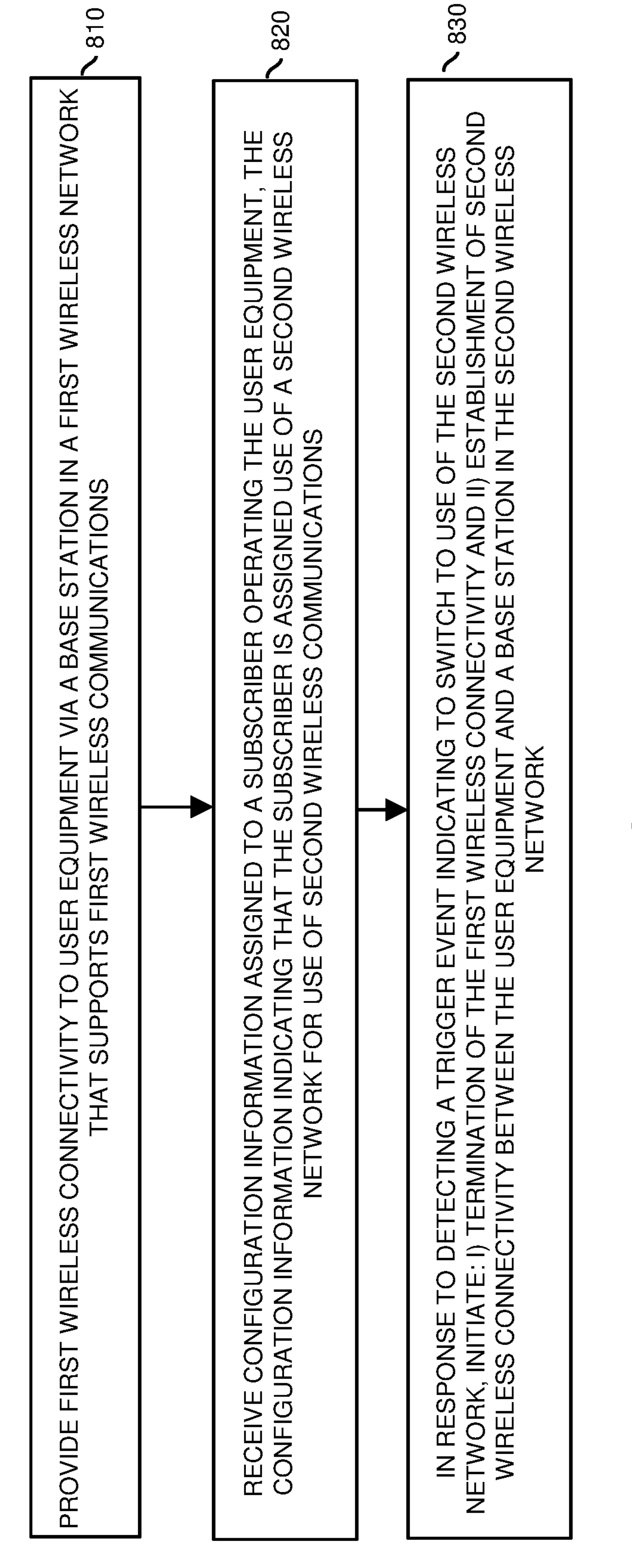
FIG. 8 is an example diagram illustrating a method according to embodiments herein.

FIG. 8 is a flowchart 800 illustrating an example method according to embodiments. Note that there will be some overlap with respect to concepts as discussed above.

In processing operation 810, the first wireless network provides first wireless connectivity to user equipment via a base station in a first wireless network that supports first wireless communications.

In processing operation 820, the network management resource receives configuration information assigned to a subscriber operating the user equipment, the configuration information indicating that the subscriber is assigned use of a second wireless network for use of second wireless communications.

In processing operation 830, in response to detecting a trigger event, the base station of the first wireless network initiates: i) (release) termination of the first wireless connectivity and ii) (redirection) establishment of second wireless connectivity between the user equipment and a base station in the second wireless network.

Note again that techniques herein are well suited to facilitate dynamic use of multiple types of different wireless networks. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:

via user equipment:

establishing first wireless connectivity with a first wireless station, the first wireless station being part of a first wireless network that supports first wireless communications;

receiving a notification from the first wireless network over the first wireless connectivity in response to the first wireless network detecting that a subscriber operating the user equipment is assigned use of a second wireless network supporting second wireless communications, the notification indicating a set of carrier frequencies, the set of carrier frequencies including first wireless carrier frequencies associated with the first wireless network and second wireless carrier frequencies associated with the second wireless network; and at the user equipment, receiving a redirect message from the first wireless network, the redirect message prompting the user equipment to establish wireless connectivity with the second wireless network instead of the first wireless network using the second wireless carrier frequencies, the second wireless carrier frequencies ranked lower in the set than the first wireless carrier frequencies.

2. The method as in claim 1, wherein the notification indicates a ranking of the first wireless carrier frequencies and the second wireless carrier frequencies.

3. The method as in claim 2, wherein the notification indicates that the first wireless carrier frequencies are ranked higher in priority than the second wireless carrier frequencies.

4. The method as in claim 3, wherein ranking of the first wireless carrier frequencies higher than the second wireless carrier frequencies as indicated by the notification causes the user equipment to camp on the first wireless network instead of the second wireless network.

5. The method as in claim 1 further comprising:

at the user equipment, in response to redirect communications received from the first wireless station, initiating termination of the first wireless connectivity, the initiated termination of the first wireless connectivity causing the user equipment to establish second wireless connectivity between the user equipment and the second wireless network using one of the second wireless carrier frequencies.

6. The method as in claim 1 further comprising:

receiving the set of wireless carrier frequencies in wireless communications transmitted from the first wireless station to the user equipment, the wireless communications indicating acceptance of establishing the first wireless connectivity.

7. The method as in claim 1, wherein a first wireless network service provider provides the subscriber use of the first wireless network; and wherein a second wireless network service provider provides the subscriber use of the second wireless network.

8. A method comprising:

via user equipment:

establishing first wireless connectivity with a first wireless station, the first wireless station being part of a first wireless network that supports first wireless communications; and receiving a notification from the first wireless network over the first wireless connectivity in response to the first wireless network detecting that a subscriber operating the user equipment is assigned use of a second wireless network supporting second wireless communications, the notification indicating a set of carrier frequencies, the set of carrier frequencies including first wireless carrier frequencies associated with the first wireless network and second wireless carrier frequencies associated with the second wireless network, the method further comprising:

at the user equipment, receiving the set of carrier frequencies from the first wireless network.

9. The method as in claim 8, wherein the second wireless carrier frequencies support second wireless connectivity to a second wireless station disposed in the second wireless network;

wherein the first wireless station supports the first wireless connectivity in a first region of wireless coverage; and wherein the second wireless station supports the second wireless connectivity in a second region of wireless coverage, the first region of wireless coverage disposed entirely within the second region of wireless coverage.

10. A system comprising:

user equipment operative to:

establish first wireless connectivity with a first wireless station, the first wireless station being part of a first wireless network that supports first wireless communications;

receive a notification from the first wireless network over the first wireless connectivity in response to the first wireless network detecting that a subscriber operating the user equipment is assigned use of a second wireless network supporting second wireless communications, the notification indicating a set of carrier frequencies, the set of carrier frequencies including first wireless carrier frequencies associated with the first wireless network and second wireless carrier frequencies associated with the second wireless network; and at the user equipment, receive a redirect message from the first wireless network, the redirect message prompting the user equipment to establish wireless connectivity with the second wireless network instead of the first wireless network using the second wireless carrier frequencies, the second wireless carrier frequencies ranked lower in the set than the first wireless carrier frequencies.

11. The system as in claim 10, wherein the notification indicates a ranking of the first wireless carrier frequencies and the second wireless carrier frequencies.

12. The system as in claim 11, wherein the notification indicates that the first wireless carrier frequencies are ranked higher in priority than the second wireless carrier frequencies.

13. The system as in claim 12, wherein ranking of the first wireless carrier frequencies higher than the second wireless carrier frequencies as indicated by the notification causes the user equipment to camp on the first wireless network instead of the second wireless network.

14. The system as in claim 10, wherein the user equipment is further operative to: receive the set of carrier frequencies from the first wireless network;

wherein the second wireless carrier frequencies support wireless connectivity to a second wireless station, the second wireless station disposed in the second wireless network;

wherein the first wireless station supports the first wireless connectivity in a first region of wireless coverage; and wherein the second wireless station supports second wireless connectivity in a second region of wireless coverage, the first region of wireless coverage disposed entirely within the second region of wireless coverage.

15. The method as in claim 3, wherein ranking of the first wireless carrier frequencies higher than the second wireless carrier frequencies in the set as indicated by the notification causes the user equipment to: i) use the first wireless network instead of the second wireless network during a first condition in which the first wireless network is available for use by the user equipment, and ii) use the second wireless network instead of the first wireless network during a second condition in which the first wireless network is unavailable for use by the user equipment.

16. The method as in claim 3, wherein ranking of the first wireless carrier frequencies higher than the second wireless carrier frequencies in the set as indicated by the notification causes the user equipment to: i) use the first wireless carrier frequencies instead of the second wireless carrier frequencies during a first condition in which the first wireless network is available for use by the user equipment, and ii) use the second wireless carrier frequencies instead of the first wireless carrier frequencies during a second condition in which the first wireless network is unavailable for use by the user equipment.

17. The method as in claim 3 further comprising:

subsequent to receiving the notification, transmitting a request over the first wireless connectivity to the first wireless station, the request requesting establishment of a voice communication session; and in response to transmitting the request, receiving the redirect message from the first wireless network, the redirect message causing the user equipment to terminate the first wireless connectivity and establish second wireless connectivity between the user equipment and the second wireless network.

18. The method as in claim 7 further comprising:

in response to receiving the redirect message, using a first wireless carrier frequency of the second wireless carrier frequencies to establish the second wireless connectivity between the user equipment and the second wireless network, the first wireless carrier frequency ranked lower in the set than the first wireless carrier frequencies.

19. The method as in claim 18 further comprising:

via the user equipment:

terminating the second wireless connectivity between the user equipment and the second wireless network; and during an idle mode of operating the user equipment after terminating the second wireless connectivity, using a highest ranked wireless carrier frequency of the first wireless carrier frequencies to camp on the first wireless network.

20. The method as in claim 1 further comprising:

subsequent to receiving the notification, transmitting a request from the user equipment over the first wireless connectivity to the first wireless station, the request requesting establishment of a communication session; and in response to transmitting the request, at the user equipment, receiving the redirect message from the first wireless network, the redirect message causing the user equipment to terminate the first wireless connectivity and establish second wireless connectivity between the user equipment and the second wireless network, the second wireless connectivity established to support the communication session.

21. The method as in claim 20 further comprising:

in response to receiving the redirect message at the user equipment, using a highest ranked wireless carrier frequency of the second wireless carrier frequencies to establish the second wireless connectivity between the user equipment and the second wireless network, the highest ranked wireless carrier frequency of the second wireless carrier frequencies being ranked lower than the first wireless carrier frequencies.

22. The method as in claim 21 further comprising:

at the user equipment, in response to terminating the second wireless connectivity, utilizing a highest ranked wireless carrier frequency of the first wireless carrier frequencies to camp on the first wireless network.

23. The method as in claim 1, wherein the first wireless carrier frequencies are ranked higher in the set than the second wireless carrier frequencies; and wherein ranking of the first wireless carrier frequencies higher in the set than the second wireless carrier frequencies results in redirection of the user equipment back to the first wireless network after termination of second wireless connectivity between the user equipment and the second wireless network.

24. The method as in claim 1 further comprising:

subsequent to receiving the notification, transmitting a request from the user equipment over the first wireless connectivity to the first wireless station, the request prompting the first wireless network to establish a communication session to support the second wireless communications; and in response to transmitting the request, receiving the redirect message from the first wireless network, the redirect message causing the user equipment to establish second wireless connectivity between the user equipment and a target communication device through the second wireless network, the second wireless connectivity supporting the communication session.

* * * * *